(12) United States Patent
Son

(10) Patent No.: US 11,387,473 B2
(45) Date of Patent: Jul. 12, 2022

(54) APPARATUS AND METHOD FOR CONTROLLING EMERGENCY DRIVING FOR FUEL CELL VEHICLE

(71) Applicants: Hyundai Motor Company, Seoul (KR); Kia Motors Corporation, Seoul (KR)

(72) Inventor: Ik Jae Son, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 420 days.

(21) Appl. No.: 16/688,946

(22) Filed: Nov. 19, 2019

(65) Prior Publication Data
US 2021/0028474 A1 Jan. 28, 2021

(30) Foreign Application Priority Data

Jul. 22, 2019 (KR) ...................... 10-2019-0088068

(51) Int. Cl.
*H01M 8/04* (2016.01)
*H01M 8/04664* (2016.01)
*H01M 8/04746* (2016.01)
*H01M 8/04119* (2016.01)
*H01M 8/04223* (2016.01)
*H01M 8/04492* (2016.01)
*H01M 8/0432* (2016.01)
*H01M 8/04537* (2016.01)
*H01M 8/04955* (2016.01)

(Continued)

(52) U.S. Cl.
CPC ..... *H01M 8/04664* (2013.01); *H01M 8/0432* (2013.01); *H01M 8/04179* (2013.01); *H01M 8/04231* (2013.01); *H01M 8/04246* (2013.01); *H01M 8/04313* (2013.01); *H01M 8/04492* (2013.01); *H01M 8/04544* (2013.01); *H01M 8/04746* (2013.01); *H01M 8/04753* (2013.01); *H01M 8/04955* (2013.01); *H01M 8/04164* (2013.01); *H01M 2008/1095* (2013.01)

(58) Field of Classification Search
CPC ........ H01M 8/04246; H01M 8/04313; H01M 8/04664; H01M 8/04955; H01M 8/04544; H01M 8/04746; H01M 8/04753; H01M 8/04179; H01M 8/04231; H01M 8/0432; H01M 8/04492; H01M 8/04164
See application file for complete search history.

(56) References Cited

U.S. PATENT DOCUMENTS 11,258,081 B2 * 2/2022 Min .................. H01M 8/04686
2010/0261080 A1 * 10/2010 Kanie ............... H01M 8/04225
429/429

(Continued)

*Primary Examiner* — Amanda C. Walke
(74) *Attorney, Agent, or Firm* — Morgan, Lewis & Bockius LLP

(57) ABSTRACT

An apparatus configured for controlling emergency driving for a fuel cell vehicle may include a failure detector configured to detect whether a purge valve and a drain valve fails; a determination portion configured to measure voltages of channels of a fuel cell stack to determine whether stability of the fuel cell stack is secured; and a controller configured to control, when the stability of the fuel cell stack is not secured and a failure occurs on one or more of the purge valve and the drain valve, one or more of an operating pressure and an operating temperature of the fuel cell stack and a current applied to the fuel cell stack.

19 Claims, 3 Drawing Sheets

(51) Int. Cl.
*H01M 8/04313* (2016.01)
*H01M 8/10* (2016.01)

(56) References Cited

U.S. PATENT DOCUMENTS

| | | | |
|---|---|---|---|
| 2016/0372767 A1* | 12/2016 | Sinha | H01M 8/04303 |
| 2017/0352903 A1* | 12/2017 | Yoshimura | H01M 8/04201 |
| 2018/0026286 A1* | 1/2018 | Yamanaka | H01M 8/04559 |
| | | | 429/432 |
| 2018/0175417 A1* | 6/2018 | Jung | H01M 8/04753 |
| 2019/0081338 A1* | 3/2019 | Takeyama | H01M 8/04671 |
| 2020/0119378 A1* | 4/2020 | Min | H01M 8/04388 |
| 2020/0290466 A1* | 9/2020 | Jeon | B60L 50/70 |

* cited by examiner

FIG. 3

| OPERATION CONDITION (TARGET TEMPERATURE, TARGET HYDROGEN PRESSURE) | | CURRENT | | | | |
|---|---|---|---|---|---|---|
| | | 22A | 43A | 86A | 130A | 160A |
| 60°C, 112kPa (REFERENCE CONDITION) | OUTLET HYDROGEN CONCENTRATION/ HYDROGEN SR | | | | | |
| 70°C, 112kPa (TEMPERATURE RISING OPERATION) | OUTLET HYDROGEN CONCENTRATION/ HYDROGEN SR | | | | | |
| 70°C, 112kPa (TEMPERATURE RISING OPERATION, PRESSURE APPLYING OPERATION) | OUTLET HYDROGEN CONCENTRATION/ HYDROGEN SR | | | | | |

STABILITY IS EXCELLENT  STABILITY IS GOOD  STABILITY IS NORMAL

APPARATUS AND METHOD FOR CONTROLLING EMERGENCY DRIVING FOR FUEL CELL VEHICLE

CROSS-REFERENCE TO RELATED APPLICATION

The present application claims priority to Korean Patent Application No. 10-2019-0088068 filed on Jul. 22, 2019, the entire contents of which is incorporated herein for all purposes by this reference.

BACKGROUND OF THE INVENTION

Field of the Invention

The present invention relates to an apparatus and a method for controlling emergency driving for a fuel cell vehicle, which are capable of securing a time for which emergency driving of a fuel cell vehicle is available when a purge valve and a drain valve of the fuel cell vehicle fail.

Description of Related Art

In general, a fuel cell system is a type of power generation system that generates electrical energy through an electrochemical reaction between hydrogen and oxygen (in the air). A fuel cell stack generates electricity through an electrochemical reaction between hydrogen, which is fuel, and oxygen in the air and discharges heat and water as by-products of the reaction. Furthermore, a fuel cell stack applied to a fuel cell vehicle includes unit cells which are disposed consecutively. Each of the unit cells includes a membrane-electrode assembly (MEA) which is located at an innermost position thereof. The MEA includes an electrolyte membrane which allows hydrogen ions to move, and a hydrogen electrode and an air electrode which are disposed on both surfaces of the electrolyte membrane to allow hydrogen and oxygen to react with the hydrogen electrode and the air electrode.

The electrolyte membrane of the fuel cell stack has a porous structure so that oxygen and nitrogen in the air electrode move to the hydrogen electrode due to a difference in concentration through the electrolyte membrane. Oxygen reacts with hydrogen on an electrode to produce water. Nitrogen is an inert gas and recirculates with hydrogen to reduce a concentration of hydrogen such that performance of a fuel cell stack. Thus, to recover a concentration of hydrogen, the fuel cell system periodically simultaneously discharges hydrogen, nitrogen, and water vapor using a purge valve. Furthermore, water which is produced on the air electrode due to a reaction in the fuel cell may move to the hydrogen electrode due to back-diffusion, reside on the hydrogen electrode, a porous layer, and a channel of a separator in the form of droplets, and hinder gas diffusion, thereby degrading the performance of the fuel cell stack. Therefore, an excessive amount of water is discharged through a hydrogen recirculation system to flow to a water trap. The excessive amount of water is periodically discharged to the air electrode through the drain valve.

However, when the purge valve and the drain valve are not operated due to disconnection, a short circuit, a poor contact, or the like, there occurs a problem in that the performance of the fuel cell stack is degraded. In the present case, since it is necessary for a vehicle to move to a safe place through emergency driving, a technique for securing stability of the fuel cell stack even in the case of a valve failure is being developed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling emergency driving for a fuel cell vehicle, which are capable of preventing degradation of performance of a fuel cell stack even in a case in which a purge valve and a drain valve fail to secure a time for which emergency driving of a fuel cell vehicle is available.

An apparatus configured for controlling emergency driving for a fuel cell vehicle according to exemplary embodiments of the present invention is provided. In an exemplary embodiment of the present invention, the apparatus configured for controlling emergency driving for a fuel cell vehicle includes a failure detector configured to detect whether a purge valve and a drain valve fails; a determination portion configured to measure voltages of channels of a fuel cell stack to determine whether stability of the fuel cell stack is secured; and a controller configured to control, when the stability of the fuel cell stack is not secured and a failure occurs on one or more of the purge valve and the drain valve, one or more of an operating pressure and an operating temperature of the fuel cell stack and a current applied to the fuel cell stack.

According to an exemplary embodiment of the present invention, when the drain valve fails, the controller may increase the operating temperature of the fuel cell stack within a preset operating temperature range.

According to an exemplary embodiment of the present invention, the controller may increase air stoichiometry (SR) of the fuel cell stack to be equal to or greater than a preset air SR.

According to an exemplary embodiment of the present invention, the controller may be configured to control a current value provided to the fuel cell stack to be less than or equal to a preset current value.

According to an exemplary embodiment of the present invention, when the purge valve fails, the controller may increase the operating pressure of the fuel cell stack to be equal to or greater than a preset operating pressure to increase a hydrogen concentration on a hydrogen electrode of the fuel cell stack.

According to an exemplary embodiment of the present invention, when the drain valve does not fail, the controller may decrease an operating period of the drain valve to increase a discharge amount of air residing on the hydrogen electrode.

According to an exemplary embodiment of the present invention, when both the drain valve and the purge valve fail, the controller may increase the operating temperature of the fuel cell stack within a preset operating temperature range and increase the operating pressure thereof to be equal to or greater than a predetermined operating pressure.

According to an exemplary embodiment of the present invention, the controller may increase air SR of the fuel cell stack to be equal to or greater than a preset air SR and control the current value provided to the fuel cell stack to be less than or equal to a preset current value.

A method of controlling emergency driving for a fuel cell vehicle according to exemplary embodiments of the present invention is provided. In an exemplary embodiment of the present invention, the method of controlling emergency driving for a fuel cell vehicle includes detecting, by a failure detector, whether a purge valve and a drain valve fails; measuring, by a determination portion, voltages of channels of a fuel cell stack to determine whether stability of the fuel cell stack is secured; and, when the stability of the fuel cell stack is not secured and a failure occurs on one or more of the purge valve and the drain valve, controlling, by a controller, one or more of an operating pressure and an operating temperature of the fuel cell stack and a current applied to the fuel cell stack.

According to an exemplary embodiment of the present invention, when the drain value is determined as failing, the controlling of one or more of the operating pressure and the operating temperature of the fuel cell stack and the current applied to the fuel cell stack may include increasing the operating temperature of the fuel cell stack within a predetermined operating temperature range.

According to an exemplary embodiment of the present invention, the method may further include, when the stability of the fuel cell stack is not secured even after the increasing the operating temperature of the fuel cell stack, increasing air stoichiometry (SR) of the fuel cell stack to be equal to or greater than a preset air SR.

According to an exemplary embodiment of the present invention, the method may further include, when the stability of the fuel cell stack is not secured even after the increasing of the air SR of the fuel cell stack, controlling, by the controller, the current value provided to the fuel cell stack to be less than or equal to a preset current value.

According to an exemplary embodiment of the present invention, when the purge value is determined as failing, the controlling of one or more of the operating pressure and the operating temperature of the fuel cell stack and the current applied to the fuel cell stack may include increasing the operating pressure of the fuel cell stack to be equal to or greater than a preset operating pressure.

According to an exemplary embodiment of the present invention, the method may further include, when the stability of the fuel cell stack is not secured even after the increasing the operating pressure of the fuel cell stack, decreasing an operating period of the drain valve to increase a discharge amount of air residing on a hydrogen electrode.

According to an exemplary embodiment of the present invention, when both the drain valve and the purge value are determined as failing, the controlling of one or more of the operating pressure and the operating temperature of the fuel cell stack and the current applied to the fuel cell stack may include increasing the operating temperature within a preset operating temperature of the fuel cell stack and increasing the operating pressure thereof to be equal to or greater than a preset operating pressure.

According to an exemplary embodiment of the present invention, the method may further include increasing air SR of the fuel cell stack to be equal to or greater than a preset air SR, wherein, when the stability of the fuel cell stack is not secured even after the increasing of the air SR of the fuel cell stack, controlling the current value provided to the fuel cell stack to be less than or equal to a preset current value may be performed.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram illustrating emergency driving conditions of a fuel cell vehicle according to an exemplary embodiment of the present invention.

Figure 1:
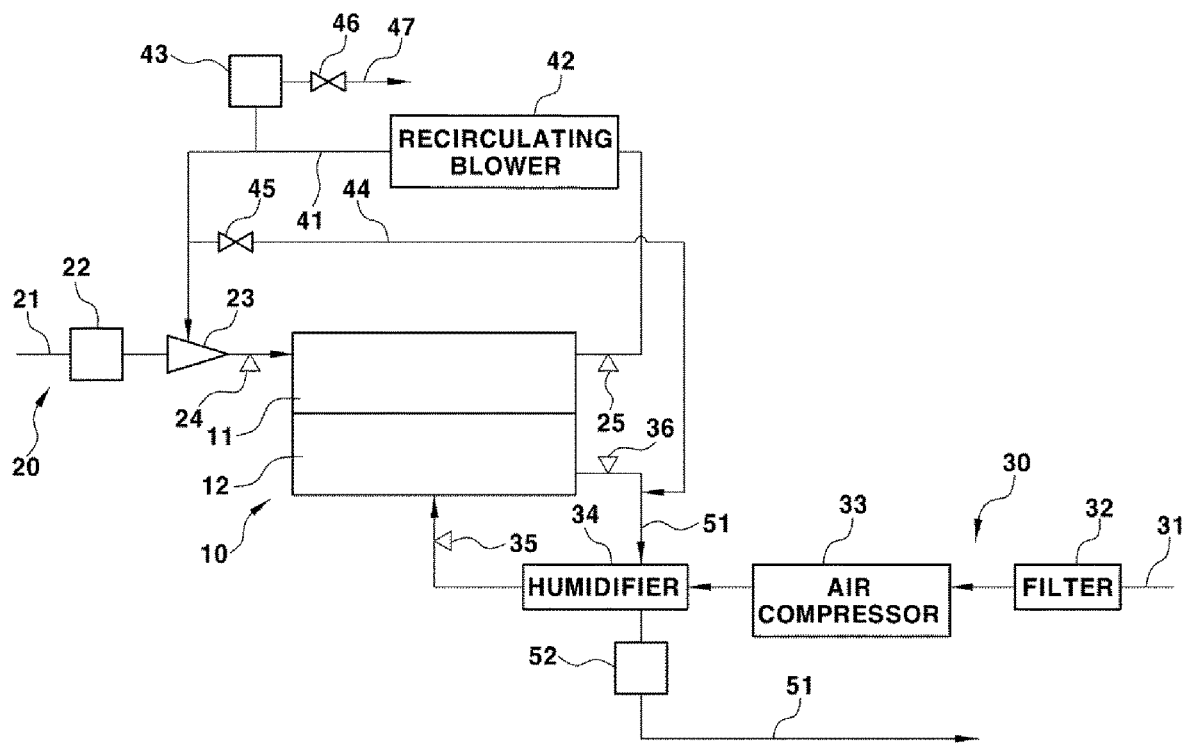
FIG. 1 is a block diagram illustrating a fuel cell system according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The advantages and features of the present invention and a manner for achieving them will become apparent with reference to the exemplary embodiments described in detail below together with the accompanying drawings. The present invention may, however, be implemented in various forms and should not be construed as being limited to the exemplary embodiments set forth herein, and the exemplary embodiments are provided such that the present disclosure will be thorough and complete and will fully convey the scope of the present invention to those skilled in the art, and the present invention is defined by only the scope of the appended claims. The same reference numerals refer to the same components throughout the present disclosure.

The terms "~ part," "~ unit," "~ module," and the like used herein mean a unit of processing at least one function or operation, and the present unit may be implemented by hardware, software, or a combination of hardware and software.

Furthermore, in the present disclosure, the terms a first, a second, and the like are assigned to components to discriminate these components because names of the components are the same, but these terms are not necessarily limited to the order in the following description.

The following detailed description illustrates the present invention. Furthermore, the foregoing is directed to illustrate and describe the exemplary embodiments of the present invention, and the present invention may be used in various other combinations, modifications, and environments. That is, it is possible to make alternations or modifications without departing from the scope of the present invention disclosed in the present disclosure, equivalents, and/or within the technical or knowledge scope in the art to which an exemplary embodiment of the present invention pertains. The described embodiments are intended to illustrate the best mode for carrying out the technical spirit of the present invention and various modification can made in the specific applications and utilizes of the present invention. Therefore, the detailed description is not intended to limit the present invention as in the disclosed exemplary embodiments. Furthermore, it should be construed that the appended claims are intended to include another exemplary embodiment of the present invention.

FIG. 1 is a block diagram illustrating a fuel cell system according to an exemplary embodiment of the present invention.

Referring to FIG. 1, a fuel cell system includes a fuel cell stack 10 having a hydrogen electrode 11 and an air electrode 12, a hydrogen supply device 20 for supplying hydrogen to the hydrogen electrode 11 of the fuel cell stack 10, and an air supply device 30 for supplying air to the air electrode 12 of the fuel cell stack 10.

The fuel cell stack 10 may be constituted of an electricity generation assembly of a unit fuel cells, each having the hydrogen electrode 11 and the air electrode 12.

The hydrogen supply device 20 may include a hydrogen supply line 21 connected from a hydrogen storage tank to an inlet of the hydrogen electrode 11, a hydrogen supply valve (HSV) 22 mounted on the hydrogen supply line 21, and an ejector 23 mounted between the inlet of the hydrogen electrode 11 and the HSV 22.

An inlet sensor 24 may be mounted at the inlet of the hydrogen electrode 11 to measure a temperature and a pressure at the inlet of the hydrogen electrode 11. An inlet sensor 25 may be mounted at an outlet of the hydrogen electrode 11 to measure a temperature and a pressure at the outlet of the hydrogen electrode 11.

A recirculation line 41 is connected to the outlet of the hydrogen electrode 11. The recirculation line 41 may connect the outlet of the hydrogen electrode 11 to the ejector 23. A recirculating blower 42 may be mounted in the middle of the recirculation line 41. A water trap 43 may be mounted on a downstream side of the recirculating blower 42 on the recirculation line 41. The water trap 43 may be connected to a drain line 47, and a drain valve 46 may be mounted on the drain line 47. The drain line 47 may be connected to the outside or to a humidifier 34.

The air supply device 30 may include an air supply line 31 connected to an inlet of the air electrode 12, a filter 32 mounted on an upstream side of the air supply line 31, an air compressor 33 mounted on a downstream side of the filter 32, and the humidifier 34 mounted on a downstream side of the air compressor 33.

An inlet sensor 35 may be mounted at the inlet of the air electrode 12 to measure a temperature and a pressure at the inlet of the air electrode 12. An outlet sensor 36 may be mounted at an outlet of the air electrode 12 to measure a temperature and a pressure at the outlet of the air electrode 12.

An air exhaust line 51 is connected to the outlet of the air electrode 12. The air exhaust line 51 may pass through the humidifier 34 to extend to the outside. An exhaust pressure regulator 52 may be mounted on a downstream of the air exhaust line 51. To use water discharged from the water trap 43 for air humidification, instead of the drain line 47 being directly connected to an air exhaust line (not shown), the drain line 47 may be connected to the air exhaust line 51 which supplies wet air, which is discharged to the humidifier 34 or the air electrode 12 of the fuel cell stack 10, to the humidifier 34. Accordingly, the water discharged from the water trap 43 may be supplied to the humidifier 34 to be utilized to humidify the air which is supplied to the air electrode 12 of the fuel cell stack 10.

A purge line 44 may branch in the middle of the recirculation line 41 to be connected to the air exhaust line 51 or the humidifier 34. A purge valve 45 may be mounted on the purge line 44. To remove foreign materials except for hydrogen in a gas, the gas and water vapor may be purged through the purge valve 45 before being introduced into the water trap 43. Condensed water introduced into the water trap 43 or condensed water which is condensed while passing through the water trap 43 may be temporarily stored and then discharged through the drain valve 46 located on a downstream of the water trap 43 according to a discharge cycle. Therefore, the purge line 44 of the gas is separated from the drain line 47 of the condensed water.

Figure 2:
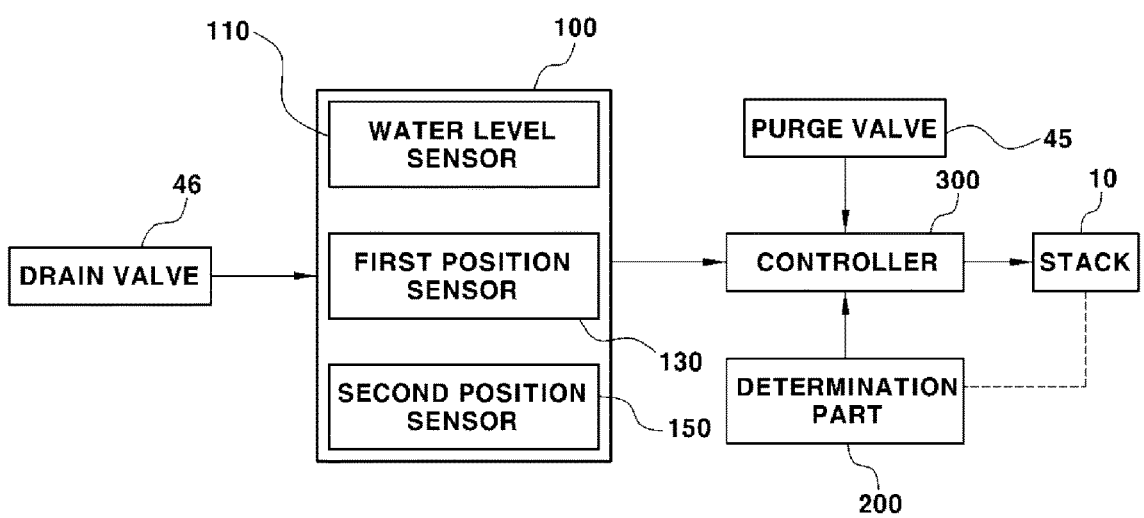
FIG. 2 is a block diagram illustrating an apparatus configured for controlling emergency driving for a fuel cell vehicle according to an exemplary embodiment of the present invention.

FIG. 2 is a block diagram illustrating an apparatus configured for controlling emergency driving for a fuel cell vehicle according to an exemplary embodiment of the present invention.

Referring to FIG. 2, the apparatus configured for controlling emergency driving for a fuel cell vehicle may include a failure detector 100, a determination portion 200, and a controller 300. The determination portion 200 may be one configuration of the controller 300 or may be a separate configuration therefrom.

The failure detector 100 may detect whether the purge valve 45 and the drain valve 46 fail. For example, the failure detector 100 may include a water level sensor 110, a first position sensor 130, and a second position sensor 150.

The water level sensor 110 is mounted in the water trap 43 of FIG. 1. The water level sensor 110 may detect a water level in the water trap 43 to detect whether the drain valve 46, which discharges water inside the water trap 43, fails.

The first position sensor 130 may detect whether the purge valve 45 fails. The first position sensor 130 may detect a position of the purge valve 45 to detect whether the purge valve 45 fails. The second position sensor 150 may detect whether the drain valve 46 fails. The second position sensor 150 may detect a position of the drain valve 46 to detect whether the drain valve 46 fails.

The determination portion 200 may measure voltages of a plurality of channels of the fuel cell stack 10. The determination portion 200 may calculate an average voltage and a minimum voltage of the plurality of channels on the basis of the voltages of the plurality of channels of the fuel cell stack 10. The determination portion 200 may determine whether stability of the fuel cell stack 10 is secured on the basis of a ratio of the minimum voltage to the average voltage or a value which is obtained by subtracting the minimum voltage from the average voltage. For example, when the ratio of the minimum voltage to the average voltage is less than 0.78, the determination portion 200 may determine that the stability of the fuel cell stack 10 is not secured. For example, when the value obtained by subtracting the minimum voltage from the average voltage is less than 40 mV, the determination portion 200 may determine that the stability of the fuel cell stack 10 is not secured. The determination portion 200 may measure a voltage of the fuel cell stack 10 in real time and determine in real time whether the stability of the fuel cell stack 10 is secured on the basis of the measured voltage.

The controller 300 may control at least one among an operating pressure and an operating temperature of the fuel cell stack 10 and a current applied thereto. When the determination portion 200 determines that the stability of the fuel cell stack 10 is not secured and at least one of the purge valve 45 and the drain valve 46 is determined as failing, the controller 300 may control at least one among the operating pressure and the operating temperature of the fuel cell stack 10 and a current applied thereto. That is, when at least one of the purge valve 45 and the drain valve 46 is determined as failing but the stability of the fuel cell stack 10 is secured, control may not be performed on the operating pressure and the operating temperature of the fuel cell stack 10 and a current applied thereto.

For example, when the drain valve 46 is determined as failing and the stability of the fuel cell stack 10 is not secured, the controller 300 may raise the operating temperature of the fuel cell stack 10 within a preset operating temperature range. For example, the preset operating temperature range may range from 70 degrees to 75 degrees. However, the preset operating temperature range may varied according to the performance of the fuel cell stack 10 and an operating environment thereof. When the operating temperature of the fuel cell stack 10 rises, water which is generated due to a chemical reaction inside the fuel cell stack 10 may be vaporized in a water vapor state. Accordingly, water which is generated on the air electrode of the fuel cell stack 10 may be back-diffused to move to the hydrogen electrode such that the water may be prevented from residing on the electrode, the porous layer, and the channels of the separator. If the water resides on the electrode, the porous layer, and the channels of the separator, the water hinders diffusion of the gas such that the performance of the fuel cell stack 10 may be degraded. That is, the water inside the fuel cell stack 10 may be evaporated as the operating temperature of the fuel cell stack 10 rises, and, as the water is evaporated, degradation of the performance of the fuel cell stack 10 may be prevented.

Furthermore, when the drain valve 46 is determined as failing and the stability of the fuel cell stack 10 is not secured, the controller 300 may increase air stoichiometry (SR) of the fuel cell stack 10 to a preset air SR. For example, the preset air SR may be 2.0. However, the preset air SR may varied according to the performance of the fuel cell stack 10 and an operating environment thereof. The controller 300 may increase air SR of the air electrode 12 of the fuel cell stack 10. When the air SR of the air electrode 12 is increased, an amount of the water vapor discharged to the outside may be increased. As an amount of the water evaporated from the air electrode 12 is increased, an amount of water moving from the air electrode 12 to the hydrogen electrode may be reduced, and an amount of the water accumulated in the water trap 43 may be minimized. Therefore, as the air SR of the cathode of the fuel cell stack 10 is increased, degradation of the performance of the fuel cell stack 10 may be prevented.

Furthermore, when the drain valve 46 is determined as failing and the stability of the fuel cell stack 10 is not secured, the controller 300 may control a current value, which is provided to the fuel cell stack 10, to be less than or equal to a preset current value. That is, the controller 300 may reduce a current value for operating the fuel cell stack 10. For example, the preset current value may be 85 A. In the present case, the preset current value may varied according to the performance of the fuel cell stack 10 and an operating environment thereof. When the current value for operating the fuel cell stack 10 is reduced, an amount of water which is generated in the fuel cell stack 10 may be reduced and an amount of hydrogen which is required by the fuel cell stack 10 may be reduced. Therefore, even at a low hydrogen concentration, the fuel cell stack 10 may be operated. Even after the control of the operating temperature of the fuel cell stack 10 and the control of the air SR are performed, the control of reducing the current value which is applied to the fuel cell stack 10 may be performed when the stability of the fuel cell stack 10 is not secured.

Alternatively, when the purge valve 45 is determined as failing and the stability of the fuel cell stack 10 is not secured, the controller 300 may increase an operating pressure of the fuel cell stack 10 to be equal to or greater than a preset operating pressure. For example, the preset operating pressure may be 150 kPa. In the present case, the preset operating pressure may varied according to the performance of the fuel cell stack 10 and an operating environment thereof. When the purge valve 45 fails, nitrogen may not be discharged and thus a hydrogen concentration may be lowered such that degradation in performance of the fuel cell stack 10 may occur. When the operating pressure of the fuel cell stack 10 is increased to be equal to or greater than the predetermined operating pressure, a partial pressure of hydrogen is increased in the hydrogen electrode of the fuel cell stack 10 such that the hydrogen concentration may be increased. Therefore, it is possible to prevent degradation of the performance of the fuel cell stack 10 due to the decrease in hydrogen concentration.

Furthermore, when the purge valve 45 is determined as failing and the stability of the fuel cell stack 10 is not secured, the controller 300 may decrease an opening period of the drain valve 46 to increase a discharge amount of the air, which resides on the hydrogen electrode of the fuel cell stack 10, through an opening of the drain valve 46. Accordingly, a discharge amount of nitrogen residing on the hydrogen electrode may be increased. In the present case, the drain valve 46 may not be in a failure state. When the opening period of the drain valve 46 is decreased, the discharge amount of nitrogen may be increase and thus the hydrogen concentration may be increased such that degradation of the performance of the fuel cell stack 10 may be prevented.

Also alternatively, when both of the purge valve 45 and the drain valve 46 are determined as failing and the stability of the fuel cell stack 10 is not secured, the controller 300 may increase the operating pressure of the fuel cell stack 10 to be equal to or greater than the preset operating pressure and increase the operating temperature of the fuel cell stack 10 within the preset temperature range. Subsequently, the controller 300 may increase the air SR of the fuel cell stack 10 to the preset air SR. When the stability of the fuel cell stack 10 is not secured even after the controller 300 controls the operating pressure, the operating temperature, and the air SR of the fuel cell stack 10, the controller 300 may control the current value provided to the fuel cell stack 10 to be less than or equal to the preset current value.

According to the exemplary embodiment of the present invention, the controller 300 may perform a separate control with respect to each of a case in which the purge valve 45 fails, a case in which the drain valve 46 fails, and a case in which both of the purge valve 45 and the drain valve 46 fail. Consequently, the vehicle may stably drive in a situation in which emergency driving is required due to a failure of the valve(s).

According to the exemplary embodiment of the present invention, when the purge valve 45 fails, the controller 300 may perform the control of increasing the hydrogen concentration of the fuel cell stack 10, and, when the drain valve 46 fails, the controller 300 may perform the control of evaporating the water residing on the hydrogen electrode of the fuel cell stack 10. Therefore, it is possible to prevent degradation of the performance of the fuel cell stack 10 due to the decrease in hydrogen concentration and impossibleness of droplet discharge.

FIG. 3 is a diagram illustrating emergency driving conditions of a fuel cell vehicle according to an exemplary embodiment of the present invention.

Referring to FIG. 3, to ensure stability of a fuel cell stack, an apparatus configured for controlling emergency driving for a fuel cell vehicle may control each of an operating temperature, an operating pressure, and an air SR of a fuel cell stack and a current applied to the fuel cell stack. The meaning that stability of the fuel cell stack is excellent is that emergency driving of the vehicle is available for 40 or more minutes, the meaning that stability of the fuel cell stack is good is that the emergency driving of the vehicle is available for more than 20 minutes and less than 40 minutes, and the meaning that stability of the fuel cell stack is normal is that the emergency driving of the vehicle is available for more than 10 minutes and less than 20 minutes. However, a criterion for determining the stability of the fuel cell stack is an item which may be varied by a designer.

For example, when the operating temperature is 60 degrees, the operating pressure is 112 kPa, and the current applied to the fuel cell stack is equal to or greater than 86 A, the stability of the fuel cell stack is not secured. In the present case, a controller may raise the operating temperature of the fuel cell stack to a temperature of 70 degrees. As the operating temperature rises, even when the current applied to the fuel cell stack is 86 A, the stability of the fuel cell stack may be secured.

Alternatively, when the operating temperature is 70 degrees, the operating pressure is 112 kPa, and the current applied to the fuel cell stack is less than or equal to 86 A, the stability of the fuel cell stack is secured. However, the stability of the fuel cell stack may be normal or good. Accordingly, to secure an available time for emergency driving of the vehicle, the controller may increase the operating pressure of the fuel cell stack to 150 kPa. In the present case, even when the current applied to the fuel cell stack is less than or equal to 86 A, the stability of the fuel cell stack is excellent. When the operating pressure of the fuel cell stack is increased, it may be seen that the hydrogen concentration is increased on the hydrogen electrode of the fuel cell stack. Consequently, the available time for emergency driving of the vehicle may be increased.

Also alternatively, when the current applied to the fuel cell stack is decreased, the stability of the fuel cell stack may be secured. When the current applied to the fuel cell stack is less than or equal to 85 A, the stability of the fuel cell stack may be secured.

Figure 4:
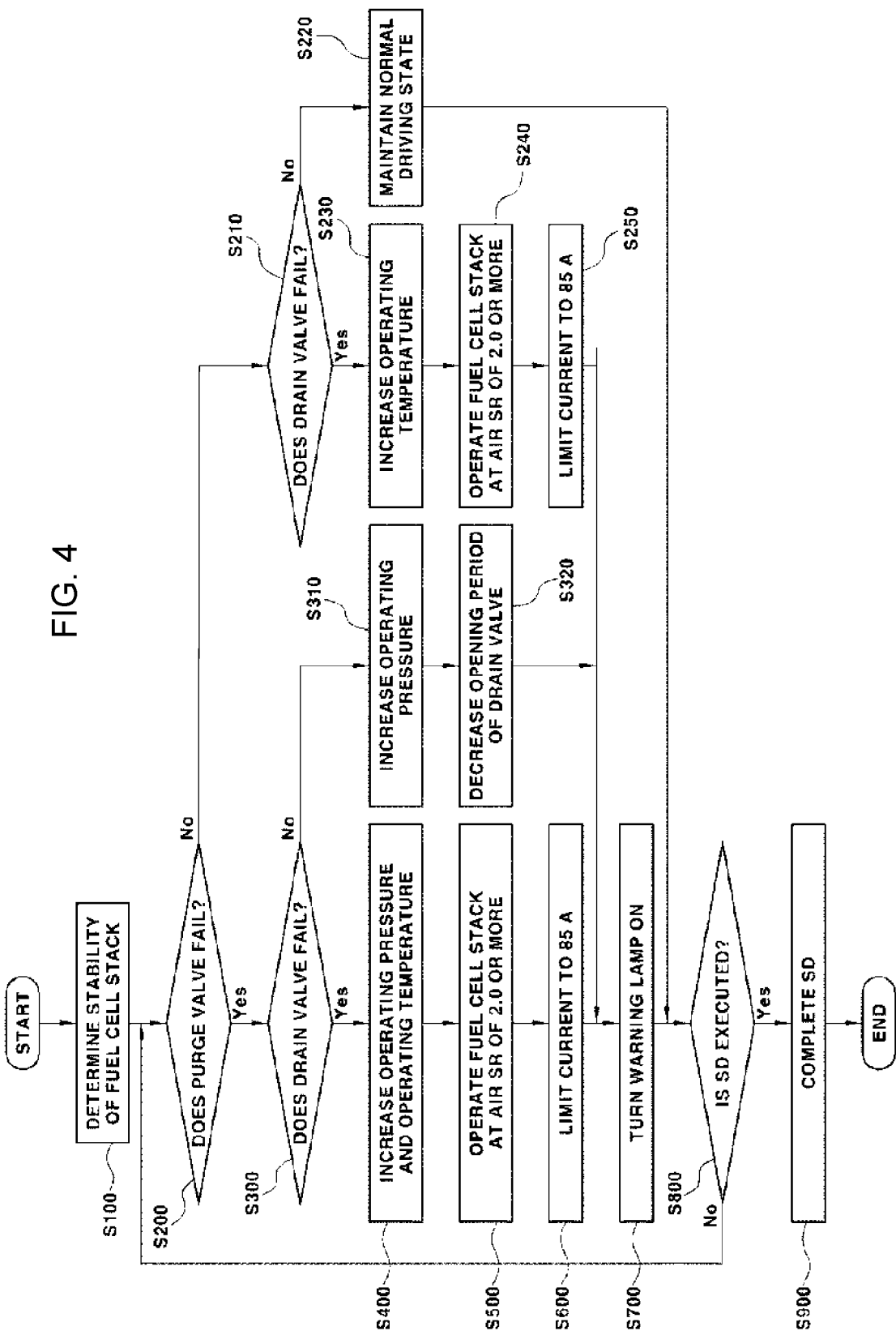
FIG. 4 is a flowchart illustrating a method of controlling emergency driving for a fuel cell vehicle according to an exemplary embodiment of the present invention.

FIG. 4 is a flowchart illustrating a method of controlling emergency driving for a fuel cell vehicle according to an exemplary embodiment of the present invention.

Referring to FIGS. 2 and 4, the determination portion 200 may determine whether the stability of the fuel cell stack 10 is secured. The determination portion 200 may measure voltages of a plurality of channels of the fuel cell stack 10. The determination portion 200 may calculate an average voltage and a minimum voltage of the plurality of channels on the basis of the voltages of the plurality of channels of the fuel cell stack 10. The determination portion 200 may determine whether stability of the fuel cell stack 10 is secured on the basis of a ratio of the minimum voltage to the average voltage or a value which is obtained by subtracting the minimum voltage from the average voltage. The determination portion 200 may determine in real time whether the stability of the fuel cell stack 10 is secured (S100).

The failure detector 100 may detect whether the purge valve 45 fails (S200).

When the failure of the purge valve 45 is not detected, the failure detector 100 may detect whether the drain valve 46 fails (S210).

When the failure of the purge valve 45 is not detected and the failure of the drain valve 46 is not detected, the vehicle may maintain a normal driving state without additional control (S220).

When the failure of the purge valve 45 is not detected and the failure of the drain valve 46 is detected, the controller 300 may perform control to increase the operating temperature of the fuel cell stack 10. For example, the controller 300 may raise the operating temperature of the fuel cell stack 10 in a range of 70 degrees to 75 degrees. In the present case, the stability of the fuel cell stack 10 may not be secured. That is, when the stability of the fuel cell stack 10 is secured, even though the failure of the drain valve 46 is detected, the controller 300 may not perform separate control (S230).

Subsequently, the controller 300 may perform control to increase the air SR of the air electrode of the fuel cell stack 10. For example, the controller 300 may increase the air SR of the air electrode of the fuel cell stack 10 to air SR of 2.0 or more to operate the fuel cell stack 10 (S240).

When the stability of the fuel cell stack 10 is not secured even though the controller 300 performs control on the operating temperature and the air SR of the fuel cell stack 10, the controller 300 may limit the current applied to the fuel cell stack 10. For example, the controller 300 may limit the current applied to the fuel cell stack 10 to be less than or equal to 85 A. When the current applied to the fuel cell stack 10 is limited, an operating rate of the fuel cell stack 10 may decrease to cause degradation in performance of the vehicle. However, in an emergency driving condition due to a failure of the valve(s), it is important for the vehicle to drive toward a safe place. Consequently, even when the performance of the vehicle is degraded, the controller 300 may limit the current applied to the fuel cell stack 10 to allow emergency driving of the vehicle (S250).

When the failure of the purge valve 45 is detected, the failure detector 100 may detect whether the drain valve 46 fails (S300).

When the failure of the purge valve 45 is detected and the failure of the drain valve 46 is not detected, the controller 300 may increase the operating pressure of the fuel cell stack 10. For example, the controller 300 may increase the operating pressure of the fuel cell stack 10 to at least 150 kPa. In the present case, the stability of the fuel cell stack 10 may not be secured. That is, when the stability of the fuel cell stack 10 is secured, even though the failure of the purge valve 45 is detected, the controller 300 may not perform separate control (S310).

Accordingly, the controller 300 may decrease the opening period of the drain valve 46 to increase a discharge amount of nitrogen through the drain valve 46. Consequently, it is possible to increase a hydrogen concentration on the hydrogen electrode of the fuel cell stack 10 (S320).

When the failures of both of the purge valve 45 and the drain valve 46 are detected, the controller 300 may increase the operating temperature and the operating pressure of the fuel cell stack 10 (S400).

Accordingly, the controller 300 may increase the air SR of the air electrode of the fuel cell stack 10 to air SR of 2.0 or more.

When the stability of the fuel cell stack 10 is not secured even after the controller 300 performs control on the operating temperature, the operating pressure, and the air SR of the fuel cell stack 10, the controller 300 may limit the current applied to the fuel cell stack 10 (S600).

The controller 300 may turn a vehicle warning lamp on after performing control to secure the performance of the fuel cell stack 10 (S700).

The controller 300 may determine whether the vehicle is shut down. When the vehicle is not shut down, the failure detector 100 may continuously detects whether the purge valve 45 and the drain valve 46 fail, and the determination portion 200 may continuously determine whether the stability of the fuel cell stack 10 is secure (S800 and S900).

In accordance with the exemplary embodiments of the present invention, an apparatus configured for controlling emergency driving can perform a separate control with respect to each of a case in which a purge valve fails, a case in which a drain valve fails, and a case in which both of the purge valve and the drain valve fail. Consequently, a vehicle may stably drive in a situation in which emergency driving is required due to a failure of the valve(s).

In accordance with the exemplary embodiments of the present invention, when the purge valve fails, the apparatus configured for controlling emergency driving can perform control of increasing a hydrogen concentration of a fuel cell stack and, when the drain valve fails, the apparatus configured for controlling emergency driving can perform control of evaporating water residing on a hydrogen electrode of the fuel cell stack. Therefore, it is possible to prevent degradation of the performance of the fuel cell stack due to the decrease in hydrogen concentration and impossibleness of droplet discharge.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling emergency driving for a fuel cell vehicle, the apparatus comprising:
   a failure detector configured to detect when at least one of a purge valve and a drain valve of a hydrogen supply device fails;
   a determination portion configured to measure voltages of channels of a fuel cell stack connected to the hydrogen supply device to determine when stability of the fuel cell stack is secured; and
   a controller configured to control at least one of an operating pressure and an operating temperature of the fuel cell stack and a current value applied to the fuel cell stack, upon determining that the stability of the fuel cell stack is not secured and a failure occurs on the at least one of the purge valve and the drain valve.

2. The apparatus of claim 1, wherein when the drain valve fails, the controller is configured to increase the operating temperature of the fuel cell stack within a predetermined operating temperature range.

3. The apparatus of claim 2, wherein the controller is configured to increase air stoichiometry (SR) of the fuel cell stack to be equal to or greater than a predetermined air SR.

4. The apparatus of claim 3, wherein the controller is configured to control the current value provided to the fuel cell stack to be less than or equal to a predetermined current value.

5. The apparatus of claim 1, wherein when the purge valve fails, the controller is configured to increase the operating pressure of the fuel cell stack to be equal to or greater than a predetermined operating pressure to increase a hydrogen concentration on a hydrogen electrode of the fuel cell stack.

6. The apparatus of claim 5, wherein the controller is configured to increase air stoichiometry (SR) of the fuel cell stack to be equal to or greater than a predetermined air SR.

7. The apparatus of claim 6, wherein the controller is configured to control the current value provided to the fuel cell stack to be less than or equal to a predetermined current value.

8. The apparatus of claim 5, wherein when the drain valve does not fail, the controller is configured to decrease an operating period of the drain valve to increase a discharge amount of air residing on the hydrogen electrode.

9. The apparatus of claim 8, wherein the controller is configured to increase the operating pressure thereof to be equal to or greater than a predetermined operating pressure.

10. The apparatus of claim 1, wherein when the drain valve and the purge valve fail, the controller is configured to increase the operating temperature of the fuel cell stack within a predetermined operating temperature range and increases the operating pressure thereof to be equal to or greater than a predetermined operating pressure.

11. The apparatus of claim 9, wherein the controller is configured to increase air SR of the fuel cell stack to be equal to or greater than a predetermined air SR and is configured to control the current value provided to the fuel cell stack to be less than or equal to a predetermined current value.

12. A method of controlling emergency driving for a fuel cell vehicle, the method comprising:
   detecting, by a failure detector, when at least one of a purge valve and a drain valve of a hydrogen supply device fails;
   measuring, by a determination portion, voltages of channels of a fuel cell stack connected to the hydrogen supply device to determine when stability of the fuel cell stack is secured; and
   when the stability of the fuel cell stack is not secured and a failure occurs on the at least one of the purge valve and the drain valve, controlling, by a controller, at least one of an operating pressure and an operating temperature of the fuel cell stack and a current value applied to the fuel cell stack.

13. The method of claim 12, wherein when the drain value is determined as failing, the controlling of at least one of the operating pressure and the operating temperature of the fuel cell stack and the current value applied to the fuel cell stack includes increasing the operating temperature of the fuel cell stack within a predetermined operating temperature range.

14. The method of claim 13, further including:
   when the stability of the fuel cell stack is not secured after the increasing the operating temperature of the fuel cell stack, increasing air stoichiometry (SR) of the fuel cell stack to be equal to or greater than a predetermined air SR.

15. The method of claim 14, further including:
   when the stability of the fuel cell stack is not secured after the increasing of the air SR of the fuel cell stack, controlling, by the controller, the current value provided to the fuel cell stack to be less than or equal to a predetermined current value.

16. The method of claim 12, wherein when the purge value is determined as failing, the controlling of at least one of the operating pressure and the operating temperature of the fuel cell stack and the current value applied to the fuel cell stack includes increasing the operating pressure of the fuel cell stack to be equal to or greater than a predetermined operating pressure.

17. The method of claim 16, further including:
   when the stability of the fuel cell stack is not secured after the increasing the operating pressure of the fuel cell stack, decreasing an operating period of the drain valve to increase a discharge amount of air residing on a hydrogen electrode of the fuel cell stack.

18. The method of claim 12, wherein when the drain valve and the purge value are determined as failing, the controlling of at least one of the operating pressure and the operating temperature of the fuel cell stack and the current value applied to the fuel cell stack includes increasing the operating temperature within a predetermined operating temperature of the fuel cell stack and increasing the operating pressure thereof to be equal to or greater than a predetermined operating pressure.

19. The method of claim 18, further including:
   increasing air SR of the fuel cell stack to be equal to or greater than a predetermined air SR,
   wherein, when the stability of the fuel cell stack is not secured after the increasing of the air SR of the fuel cell stack, controlling the current value provided to the fuel cell stack to be less than or equal to a predetermined current value is performed.

* * * * *